United States Patent
Higgins et al.

(10) Patent No.: US 7,770,266 B2
(45) Date of Patent: *Aug. 10, 2010

(54) TRIM RETAINER

(75) Inventors: Lawrence J. Higgins, Sterling Heights, MI (US); Steven Michael Benedetti, Sterling Heights, MI (US); Girishsingh A. Mokashi, Sterling Heights, MI (US)

(73) Assignee: Newfrey LLC, Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/333,706

(22) Filed: Dec. 12, 2008

(65) Prior Publication Data

US 2009/0089982 A1 Apr. 9, 2009

Related U.S. Application Data

(63) Continuation of application No. 11/371,340, filed on Mar. 8, 2006, now Pat. No. 7,481,474.

(51) Int. Cl.
*B60R 13/00* (2006.01)
(52) U.S. Cl. ........................................ 24/297
(58) Field of Classification Search ............. 24/292, 24/289, 297, 453; 411/508–510; 296/1.08, 296/39.1, 146.7
See application file for complete search history.

(56) References Cited

U.S. PATENT DOCUMENTS 3,029,486 A 4/1962 Raymond
3,093,874 A * 6/1963 Rapata ................. 411/508
3,905,270 A 9/1975 Hehl
D268,006 S 2/1983 Wollar
4,393,551 A 7/1983 Wollar et al.
4,422,276 A 12/1983 Paravano
4,427,328 A 1/1984 Kojima
4,431,355 A 2/1984 Junemann et al.
4,472,918 A 9/1984 Mach
4,489,465 A * 12/1984 Lemkin ................. 24/289
4,505,611 A 3/1985 Nagashima et al.

(Continued)

FOREIGN PATENT DOCUMENTS

DE  2 250 729  3/1974

(Continued)

OTHER PUBLICATIONS

Drawing No. W703613—Ford Clip, Pnl Trim PSH IN (believed to have been offered for sale prior to Mar. 2006).

(Continued)

*Primary Examiner*—James R Brittain
(74) *Attorney, Agent, or Firm*—Harness, Dickey & Pierce, P.L.C.

(57) ABSTRACT

A retainer employs a flexible arm with an internal rib. In another aspect of the present invention, a retainer has at least one generally triangularly shaped projection laterally extending from an arm. A further aspect of the present invention retainer provides a laterally enlarged member, a trim panel-retaining head and stem, a central post, one or more flexible wings flexibly spanning between a tip of the post and the laterally enlarged member, and an internal rib and/or at least a pair of generally angular extensions flexibly extending from each arm.

20 Claims, 4 Drawing Sheets

U.S. PATENT DOCUMENTS

| | | | |
|---|---|---|---|
| 4,715,095 A | 12/1987 | Takahashi | |
| 4,778,320 A | 10/1988 | Nakama et al. | |
| 4,810,147 A | 3/1989 | Hirohata et al. | |
| 4,861,208 A | 8/1989 | Boundy | |
| 4,938,645 A | 7/1990 | Wollar | |
| 4,987,656 A | 1/1991 | Sato | |
| 5,011,356 A | 4/1991 | Fernandez et al. | |
| 5,039,267 A | 8/1991 | Wollar | |
| 5,046,223 A | 9/1991 | Kraus et al. | |
| 5,106,223 A | 4/1992 | Kraus et al. | |
| 5,152,582 A | 10/1992 | Magnuson | |
| 5,165,833 A | 11/1992 | Watanabe et al. | |
| 5,173,026 A | 12/1992 | Cordola et al. | |
| 5,191,513 A | 3/1993 | Sugiura et al. | |
| 5,217,337 A | 6/1993 | Junemann et al. | |
| 5,301,396 A | 4/1994 | Benoit | |
| 5,316,423 A | 5/1994 | Kin et al. | |
| 5,319,839 A | 6/1994 | Shimajiri et al. | |
| 5,322,402 A | 6/1994 | Inoue et al. | |
| D354,219 S | 1/1995 | Shimajiri | |
| D355,113 S | 2/1995 | Shimajiri | |
| 5,393,185 A | 2/1995 | Duffy, Jr. | |
| 5,468,108 A | 11/1995 | Sullivan et al. | |
| 5,507,610 A | 4/1996 | Benedetti et al. | |
| 5,551,817 A | 9/1996 | Kanie et al. | |
| 5,573,362 A | 11/1996 | Asami et al. | |
| 5,586,853 A | 12/1996 | Poe | |
| 5,592,719 A | 1/1997 | Eto et al. | |
| 5,651,634 A | 7/1997 | Kraus et al. | |
| 5,689,863 A | 11/1997 | Sinozaki et al. | |
| 5,694,666 A | 12/1997 | Hamamoto et al. | |
| 5,704,753 A | 1/1998 | Ueno et al. | |
| D390,776 S | 2/1998 | Ueno | |
| 5,724,709 A | 3/1998 | Kittmann et al. | |
| 5,775,859 A | 7/1998 | Anscher | |
| 5,851,097 A | 12/1998 | Shereyk et al. | |
| 5,975,820 A | 11/1999 | Kirchen | |
| 6,039,523 A | 3/2000 | Kraus et al. | |
| 6,209,178 B1 | 4/2001 | Wiese et al. | |
| 6,264,393 B1 | 7/2001 | Kraus et al. | |
| 6,287,043 B1 | 9/2001 | Kraus et al. | |
| 6,305,055 B1 | 10/2001 | Castro | |
| 6,336,768 B1 | 1/2002 | Kraus et al. | |
| D456,699 S | 5/2002 | Nakanishi | |
| 6,449,814 B1 | 9/2002 | Dinsmore et al. | |
| 6,572,317 B2 * | 6/2003 | Okada et al. | 411/508 |
| 6,910,840 B2 * | 6/2005 | Anscher | 411/41 |
| 7,481,474 B2 * | 1/2009 | Higgins et al. | 296/1.08 |
| 2002/0028123 A1 | 3/2002 | Miura et al. | |
| 2005/0095084 A1 * | 5/2005 | Hansen | 411/508 |

FOREIGN PATENT DOCUMENTS

| | | |
|---|---|---|
| GB | 8 07726 | 1/1959 |
| GB | 1 384 839 | 2/1975 |
| GB | 2 125 878 | 3/1984 |
| GB | 2 360 322 | 9/2001 |
| WO | WO/03/093690 | 11/2003 |

OTHER PUBLICATIONS

Four (4) photographs of Emhart Part No. 16803 (offered for sale prior to Mar. 2005).

Five (5) photographs of Emhart Part No. 16872 (offered for sale prior to Mar. 2005).

Four (4) photographs of Emhart Part No. 16363 (offered for sale prior to Mar. 2005).

Two (2) Photographs and one (1) Drawing of TRW Shark Fin Clip, Part No. 60006118A (offered for sale prior to Mar. 2005).

European Search Report dated Nov. 20, 2007, 10 pages.

* cited by examiner

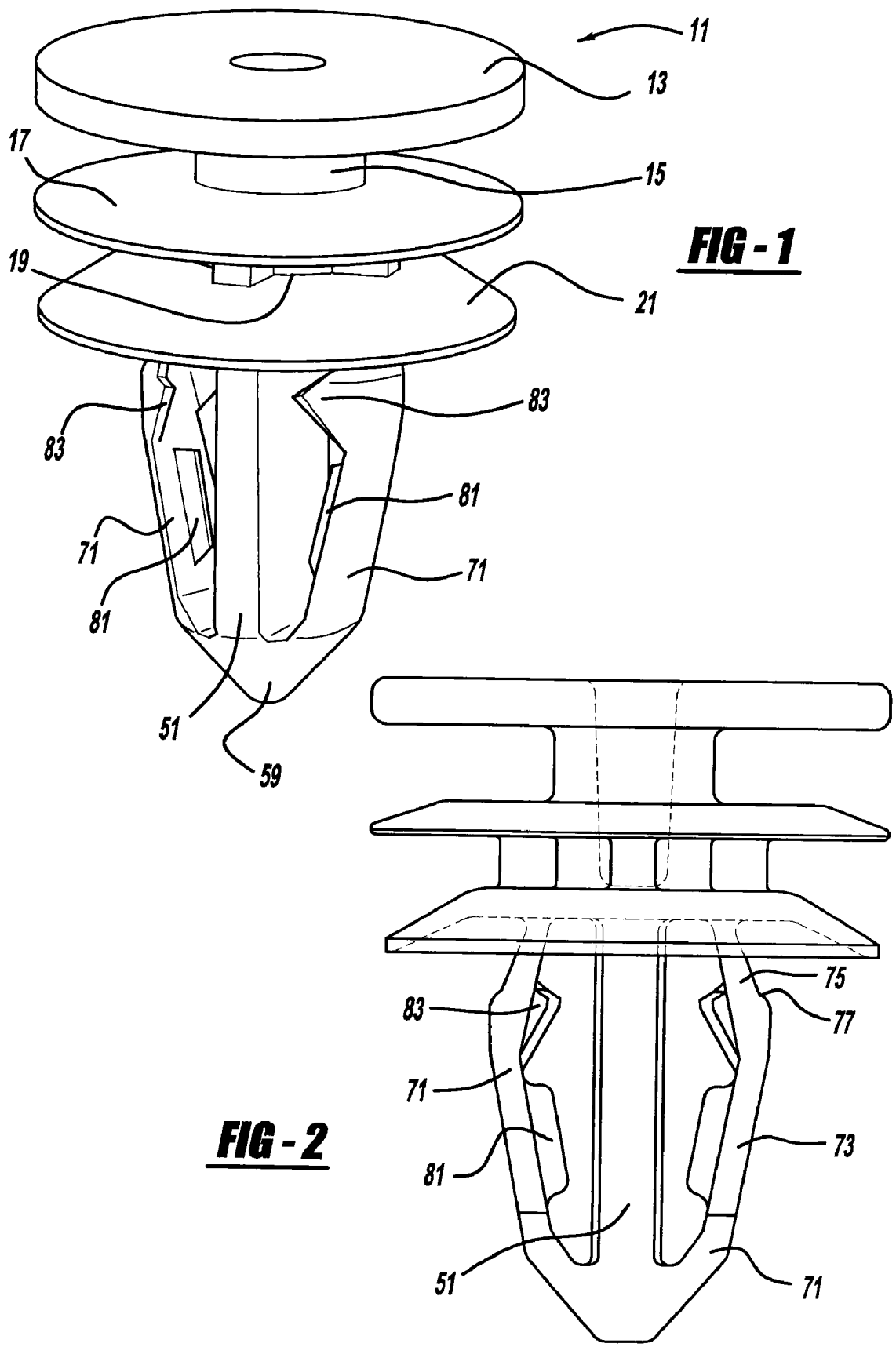

TRIM RETAINER

CROSS REFERENCE TO RELATED APPLICATION

This application is a continuation of U.S. application Ser. No. 11/371,340, filed Mar. 8, 2006, which is incorporated by reference herein.

BACKGROUND

The present application relates generally to fasteners and more particularly to an automotive vehicle trim retainer.

Conventional polymeric fasteners have been used in the automotive industry to retain interior trim panels to sheet metal structure. Examples of such traditional fasteners are disclosed in the following U.S. Pat. No. 5,592,719 entitled "Fastening Clip" which issued to Eto et al. on Jan. 14, 1997; U.S. Pat. No. 5,573,362 entitled "Fastener Including Elastic Legs for Retaining the Fastener in a Mounting Hole" which issued to Asami et al. on Nov. 12, 1996; and U.S. Pat. No. 5,301,396 entitled "Fastener Assembly with Compression Member" which issued to Benoit on Apr. 12, 1994; all of which are incorporated by reference herein. Known fasteners such as these have unsuccessfully attempted to provide desirable insertion versus extraction forces while also achieving self-centering and over-compression resistance. Moreover, many conventional polymeric fasteners are not acceptably reusable after removal from the often sharp, sheet metal hole edges.

SUMMARY

In accordance with the present invention, a retainer employs a flexible arm with an internal rib. In another aspect of the present invention, a retainer has at least one generally triangularly shaped projection laterally extending from an arm. A further aspect of the present invention retainer provides a laterally enlarged member, a trim panel-retaining head and stem, a central post, one or more flexible wings flexibly spanning between a tip of the post and the laterally enlarged member, and an internal rib and/or at least a pair of generally angular extensions flexibly extending from each arm.

The retainer of the present invention is advantageous over conventional fasteners in that the ribs of the present invention deter the arm from taking an undesired "set" by not allowing each arm to become over-compressed or collapse more than is desired to clear the sheet metal hole into which the retainer is designed for. Furthermore, the generally triangular projections or angular extensions assist in achieving somewhat higher and more consistent extraction forces over a greater range of reusability as compared to prior door trim retainers. Additional advantages and features of the present invention will become apparent from the following description and appended claims, taken in conjunction with the accompanying drawings.

BRIEF DESCRIPTION OF THE DRAWINGS

FIG. 1 is a prospective view showing the preferred embodiment of a trim retainer of the present invention;

FIG. 2 is a side elevational view showing the preferred embodiment retainer disposed in a free condition;

DETAILED DESCRIPTION OF THE PREFERRED EMBODIMENT

Figure 3:
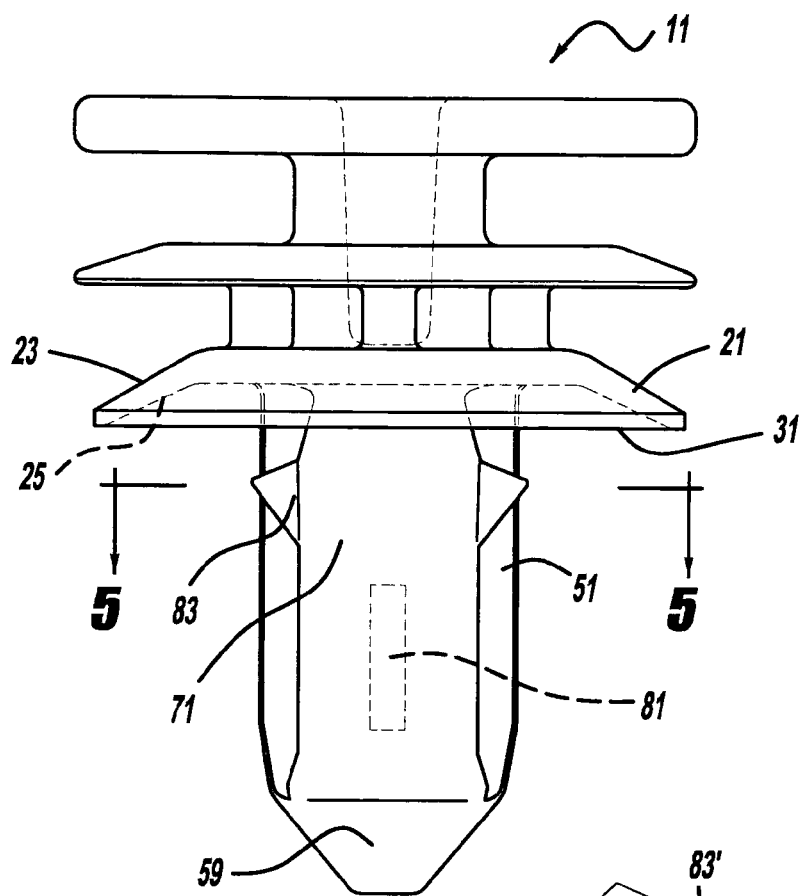
FIG. 3 is a side elevational view, taken 90 degrees to that of FIG. 2, showing the preferred embodiment retainer.

Referring to FIGS. 1-3, 5 and 7, a trim retainer or fastener 11 has a first circular head 13, a circular-cylindrical stem 15, a circular second head 17, a second stem 19 and a laterally enlarged umbrella 21. Second stem 19 has a circular-cylindrical central section bordered by four radially extending supports, each having a generally rectangular cross sectional shape. Umbrella 21 is somewhat flexible, has a tapered top surface 23, and has a somewhat concave and undercut bottom surface 25. A dog house 27 of an interior trim panel 29 is removable affixed to first stem 15 between first and second heads 13 and 17, respectively. Furthermore, a lower edge 31 of umbrella 21 seals against a face of a structural body panel 33 to deter transmission of moisture through a hole 35 and body panel 33.

A post 51 centrally and coaxially extends from the bottom of umbrella 21. Post 51 has a typical cross sectional shape defined by opposite lateral edges 53, each having a slightly curved configuration, and slightly tapered and somewhat flat internal segments 55 connected to middle flat segments 57. A tapered tip 59 is located at a leading end of post 51 opposite umbrella 21. An arm 71 flexibly spans between a leading end of post 51 adjacent tip 59 and bottom surface 25 of umbrella 21. It is alternately envisioned that a trailing end of arm 71 is flexibly connected to the trailing end of post 51 although the performance may not be as desirable as with the preferred embodiment. Returning to the preferred embodiment, post 51 is elongated in a longitudinal direction and arm 71 is also predominately elongated in the longitudinal direction but defined by a first lead in angled segment 73 and a reversed angled securing segment 75. There are two arms 71 which are in mirrored symmetry to each other, and separated by post 51. An external notch 77 is located on each arm 71.

An internally projecting rib 81 extends in a somewhat longitudinally elongated manner from an inside surface of each arm 71. Each rib 81 has a generally rectangular cross sectional shape of less lateral width than the adjacent segment of the arm. Furthermore, a pair of angular extension wings 83, of generally triangular shape, laterally and circumferentially project from lateral edges of each arm 71. Retainer 11 is preferably injection molded from an impact modified acetal copolymer plastic material, however, it should be appreciated that other materials may alternately be employed.

Figure 4:
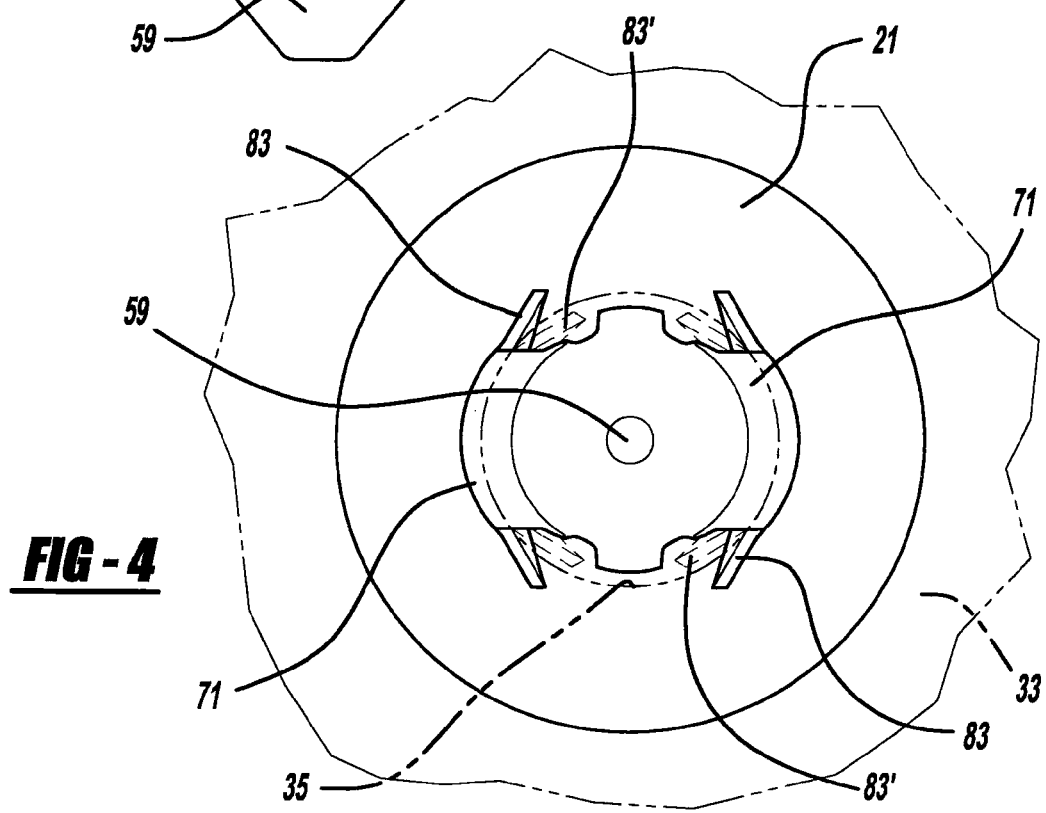
FIG. 4 is an end elevational view, viewed from a tip, showing the preferred embodiment retainer, with the solid lines indicating its free condition and the dashed lines indicating its compressed insertion condition.
Figure 5:
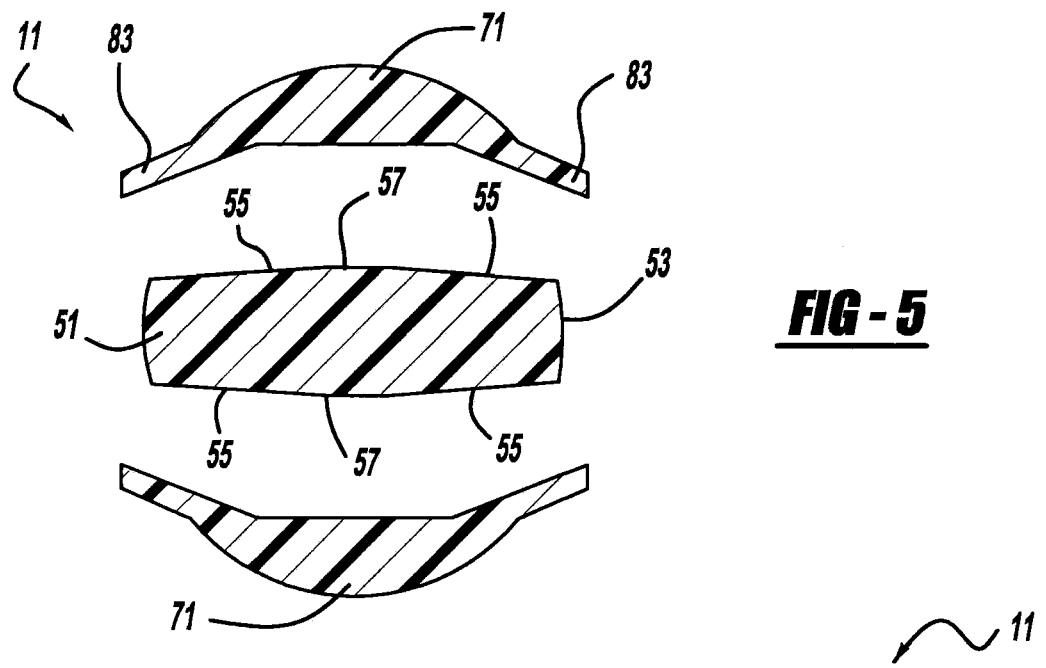
FIG. 5 is a cross sectional view, taken a long line 5-5 of FIG. 3, showing the preferred embodiment retainer.
Figure 6:
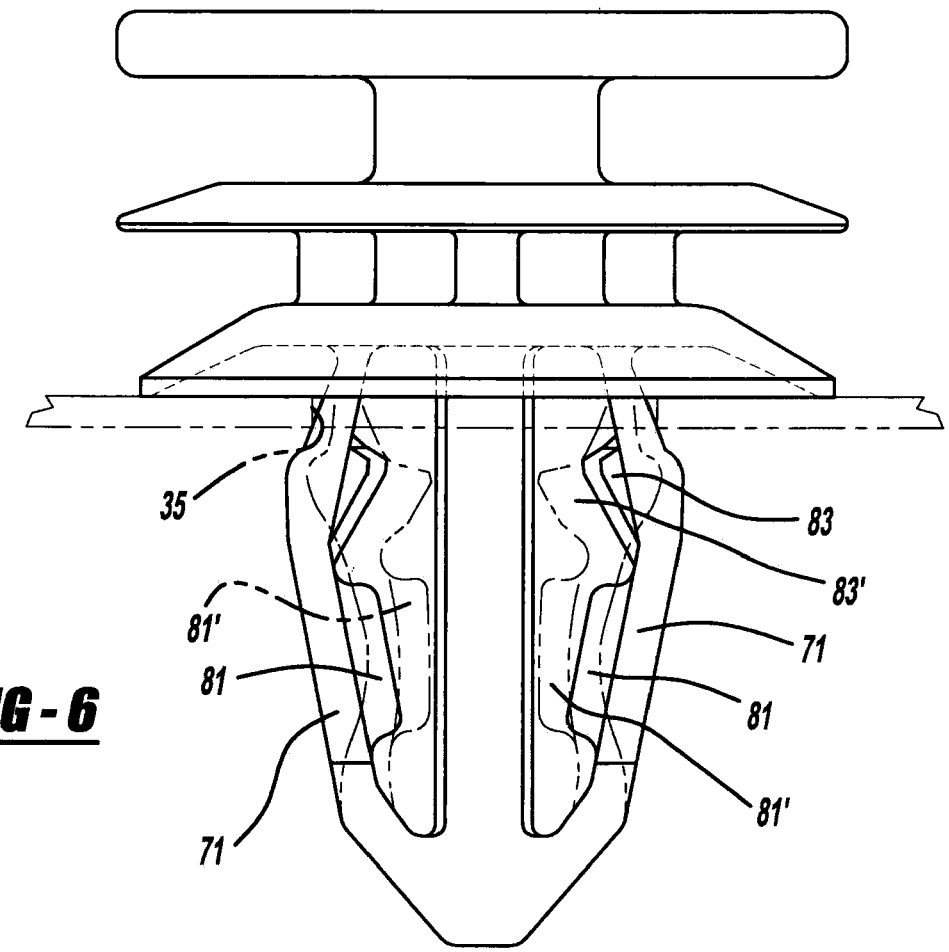
FIG. 6 is a side elevational view, like that of FIG. 2, showing the preferred embodiment retainer, with the solid lines indicating its free condition and the phantom lines indicating its compressed insertion condition.
Figure 7:
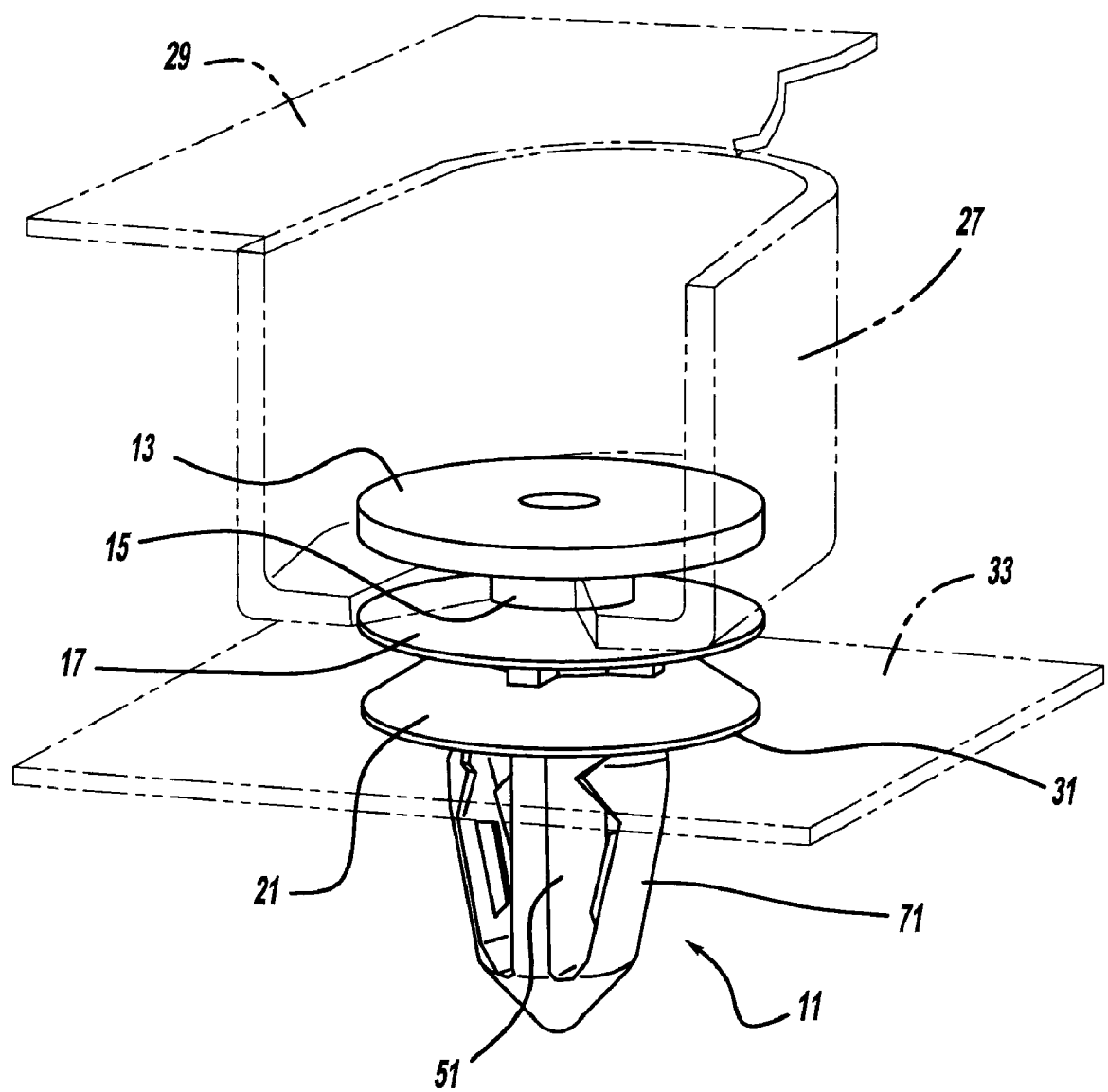
FIG. 7 is a perspective view showing the preferred embodiment retainer fastening an interior trim panel to an automotive vehicle body panel.

During use, an automotive vehicle, interior trim panel, such as an interior door trim panel, is secured to the heads and stem of retainer 11. Stem 15 is snapped in a sliding manner into a key-holed opening in dog house 27, as is shown in FIG. 7. Thereafter, tip 59 of retainer 11 is aligned with hole 35 in sheet metal body panel 33 (for example, a structural door panel or quarter inner panel). This can best be observed in FIGS. 4, 6 and 7. Trim panel 29 is then manually pushed toward body panel 33 such that contact of an internal edge of hole 35 against leading segment 73 of each arm 71 caused inward flexure of each arm 71 towards post 51. Thus, rib 81 is moved from its free position to a compressed position 81' as can be seen in FIG. 6. An internal edge of each rib 81' operably contacts against a generally parallel segment 57 (see FIG. 5) of post 51 to deter over-compression and setting of each arm 71. Body panel 33 rides against leading edges of wings 83 there by being inwardly flexed to positions 83' (see FIG. 4) relative to the adjacent arm segment passing through hole 35. Arms 71 and wings 83 return substantially to their free positions, but with slight compression, when retainer 11 is fully inserted into body panel 33, as shown in FIG. 6. It is noteworthy that the slightly tapered segments 55 of post 51 allow for the inward flexure of wings 83 while the middle segments 57 operably abut against ribs 81 when arms 71 are fully compressed. Thus, significantly improved extraction force consistency, improved reusability performance, insertion self-centering and minimization of arm setting are possible with the present invention.

While certain aspects of the trim retainer have been disclosed, it should be appreciated that other variations maybe employed. For example, a trim retainer of the present invention can be used for securing other automotive vehicle components, such as and not be limited to, garnish moldings, package shelves, sail trim panels, headliners, lamps, trunk trim and the like. Moreover, slightly different wing, rib, arm, post and other shapes may be provided, such as with additional radii and the like, although various advantages of the present invention may not be realized. It should also be appreciated that the present invention ribs may or may not be used in combination with the present invention wings, although various advantages of the present invention may not be realized. Additionally, the post and tip may extend longitudinally beyond the leading intersection of the arms to provide an additional alignment and locating feature prior to full insertion, although again, all of the advantages of the present invention may not be provided. It is alternately envisioned that more or less heads and wings may be included, although various advantageous of the present invention may not be utilized. It is intended by the following claims to cover these and any other departures from the disclosed embodiments which fall within the true spirit of this invention.

The invention claimed is:

1. An apparatus comprising:
   an automotive vehicle trim panel;
   a central post elongated in a longitudinal direction and having a substantially flat longitudinal surface;
   a laterally enlarged umbrella affixed to a trailing end of the post;
   at least one head coupled to the umbrella opposite the post, the head being coupled to the trim panel;
   a pair of arms having ends flexibly coupled to at least one of the post and the umbrella;
   a rib internally extending from each of the arms, the rib being elongated in an elongated direction of each of the arms and having a lateral cross section smaller than that of the adjacent segment of the corresponding arm, the ribs being spaced away from the post when in their free positions and being moved to inward positions toward the post during arm compression; and
   a notch located on an external surface of each of the arms; wherein the post, umbrella, head, arms, ribs and notches are all a single polymeric piece.

2. The apparatus of claim 1, wherein the umbrella has a substantially concave shape adjacent the post, and a leading end of each of the arms is attached to a leading end of the post and a trailing end of each of the arms is attached to the umbrella.

3. The apparatus of claim 1, wherein:
   the at least one head further comprises a second head coupled to a first head by a stem; and
   the heads, the stem and the umbrella are substantially coaxial.

4. The apparatus of claim 1, wherein the ribs are located on surfaces of the arms opposite the notches longitudinally between the notches and the leading ends of the arms.

5. The apparatus of claim 1, wherein a substantially flat surface of the post faces one of the arms and the post has a substantially flat leading end.

6. A retainer apparatus comprising:
   a central post elongated in a longitudinal direction;
   a laterally enlarged member affixed to a trailing end of the post;
   at least one elongated arm having a first end flexibly coupled to the post; and
   a rib internally extending from the arm, the rib being spaced away from the post when in its free position and being movable to an inward position immediately adjacent the post during flexing of the arm, the rib extending in a somewhat longitudinally elongated manner and having a lateral width less than the adjacent segment of the arm.

7. The retainer apparatus of claim 6, further comprising a stem and a head coupled to the laterally enlarged member by the stem, and the laterally enlarged member having a substantially concave shape adjacent the post.

8. The retainer apparatus of claim 7, further comprising a second stem and a second head coupled to the first head by the second stem, the heads and the laterally enlarged member being substantially coaxial, the stems and the post being substantially coaxial.

9. The retainer apparatus of claim 6, further comprising a stem and head coupled to the post, and the retainer apparatus being an automotive interior trim panel fastener.

10. The retainer apparatus of claim 6, wherein a second end of the arm is flexibly connected to the laterally enlarged member.

11. The retainer apparatus of claim 6, further comprising a structural panel-engaging notch located on an external surface of the arm.

12. The retainer apparatus of claim 6, further comprising a second arm flexibly coupled to the post, a rib internally projecting from the second arm, only the two arms flexibly extending from the post.

13. The retainer apparatus of claim 6, wherein the post has a substantially flat surface segment facing the arm and the rib has a generally rectangular cross sectional shape.

14. The retainer apparatus of claim 6, wherein the laterally extending member, post and arm are all a single polymeric material piece.

15. An automotive vehicle fastener comprising:
   a central member elongated in a longitudinal direction;
   a laterally enlarged member affixed to a trailing end of the central member;
   at least one elongated arm having a first end attached to the central member, and a second end of the arm being attached to the laterally enlarged member; and
   a rib mounted to an inside of the arm, the rib being spaced away from the central member when in its free position and being closer to the central member during arm insertion;

the rib being substantially elongated in an insertion direction of the automotive vehicle fastener during insertion, the rib further having a lateral width smaller than that of the adjacent segment of the arm, and the rib having a substantially flat surface facing toward the central member.

16. The fastener of claim 15, wherein the laterally enlarged member, central member and arm are all a single polymeric material piece.

17. The fastener of claim 15, further comprising a stem and a head coupled to the laterally enlarged member by the stem, and the laterally enlarged member having a substantially concave shape adjacent the central member.

18. The fastener of claim 15, further comprising a structural vehicular panel-engaging notch located on an external surface of the arm.

19. The fastener of claim 15, further comprising a second arm flexibly coupled to the central member, a rib internally projecting from the second arm, only the two arms flexibly extending from the central member.

20. The fastener of claim 15, wherein the central member has a substantially flat surface segment facing the arm and the rib has a generally rectangular cross sectional shape.

* * * * *